(12) United States Patent
Madaiah (10) Patent No.: US 9,473,391 B2
(45) Date of Patent: Oct. 18, 2016

(54) PROTECTION SWITCHING METHOD, SYSTEM AND A NODE IN AN LTE NETWORK

(71) Applicant: TEJAS NETWORKS LIMITED, Bangalore, Karnataka (IN)

(72) Inventor: Vinod Kumar Madaiah, Karnataka (IN)

(73) Assignee: Tejas Networks Limited, Bangalore (IN)

( * ) Notice: Subject to any disclaimer, the term of this patent is extended or adjusted under 35 U.S.C. 154(b) by 531 days.

(21) Appl. No.: 13/721,197

(22) Filed: Dec. 20, 2012

(65) Prior Publication Data

US 2013/0155844 A1 Jun. 20, 2013

(30) Foreign Application Priority Data

Dec. 20, 2011 (IN) .......................... 4479/CHE/2011

(51) Int. Cl.
| | |
|---|---|
| *H04J 1/16* | (2006.01) |
| *H04L 12/703* | (2013.01) |
| *H01Q 1/24* | (2006.01) |
| *H01Q 21/28* | (2006.01) |
| *H04L 12/28* | (2006.01) |
| *H04W 92/20* | (2009.01) |
| *H04W 16/28* | (2009.01) |

(52) U.S. Cl.
CPC .............. *H04L 45/28* (2013.01); *H01Q 1/246* (2013.01); *H01Q 21/28* (2013.01); *H04W 16/28* (2013.01); *H04W 92/20* (2013.01)

(58) Field of Classification Search
USPC ................................ 370/216, 241, 329, 386
See application file for complete search history.

(56) References Cited

U.S. PATENT DOCUMENTS

| | | | | |
|---|---|---|---|---|
| 6,058,307 | A * | 5/2000 | Garner ............... | H04B 7/18539 455/12.1 |
| 6,272,351 | B1 * | 8/2001 | Langston et al. ............. | 455/507 |
| 2002/0105928 | A1 * | 8/2002 | Kapoor et al. ................ | 370/334 |
| 2003/0202506 | A1 * | 10/2003 | Perkins et al. ................ | 370/352 |
| 2006/0218298 | A1 * | 9/2006 | Knapp et al. ................. | 709/238 |
| 2011/0149905 | A1 * | 6/2011 | Kim ............................. | 370/331 |
| 2011/0242970 | A1 * | 10/2011 | Prakash et al. ............... | 370/225 |
| 2011/0268007 | A1 * | 11/2011 | Barany et al. ................ | 370/312 |
| 2012/0082100 | A1 * | 4/2012 | Ahmadi ........................ | 370/329 |
| 2015/0230105 | A1 * | 8/2015 | Negus .................. | H04B 7/0408 370/329 |

* cited by examiner

*Primary Examiner* — John Pezzlo
(74) *Attorney, Agent, or Firm* — Merchant & Gould P.C.

(57) ABSTRACT

A method and a system for protection switching is provided. The system includes a plurality of base transceiver station (BTS) linked by a communication network over which each of the plurality of BTS communicate. The plurality of BTS includes a primary BTS and at least two secondary BTS. Each of the plurality of BTS further includes at least two bidirectional antennas, provisioning traffic to at least one secondary BTS as work BTS for backhauling a traffic. The traffic includes a user data traffic or a control and signaling data traffic from the primary BTS. The primary BTS periodically checks for control signal from the plurality of BTS. The primary BTS, upon detection of a failure in a link between the primary BTS and the secondary BTS, may steer a beam to a next available secondary BTS as a protect BTS.

16 Claims, 7 Drawing Sheets

PROTECTION SWITCHING METHOD, SYSTEM AND A NODE IN AN LTE NETWORK

FIELD OF THE INVENTION

This application claims benefit of Ser. No. 4479/CHE/2011, filed 20 Dec. 2011 in India and which application is incorporated herein by reference. To the extent appropriate, a claim of priority is made to the above disclosed application.

The present invention relates to wireless communication system. More particularly, the present invention relates to a protection switching method, system and a node in an LTE network.

BACKGROUND OF THE INVENTION

Wireless communication links are well known and widely used in connection with backhaul communication. Here, the expression "backhaul communication" is used for the communication between a core network or similar (e.g. such as the Evolved Packet Core (EPC) in the Long Term Evolution (LTE)) and one or several radio access nodes or similar (e.g. one or several base stations or similar) in a wireless communication network, and/or the communication that occurs between one or several radio access nodes and an access node controller or similar (e.g. a Base Station Controller (BSC) or a Radio Network Controller (RNC)) in a wireless communication network, and/or between an access node controller and the core network or similar.

Figure 1:
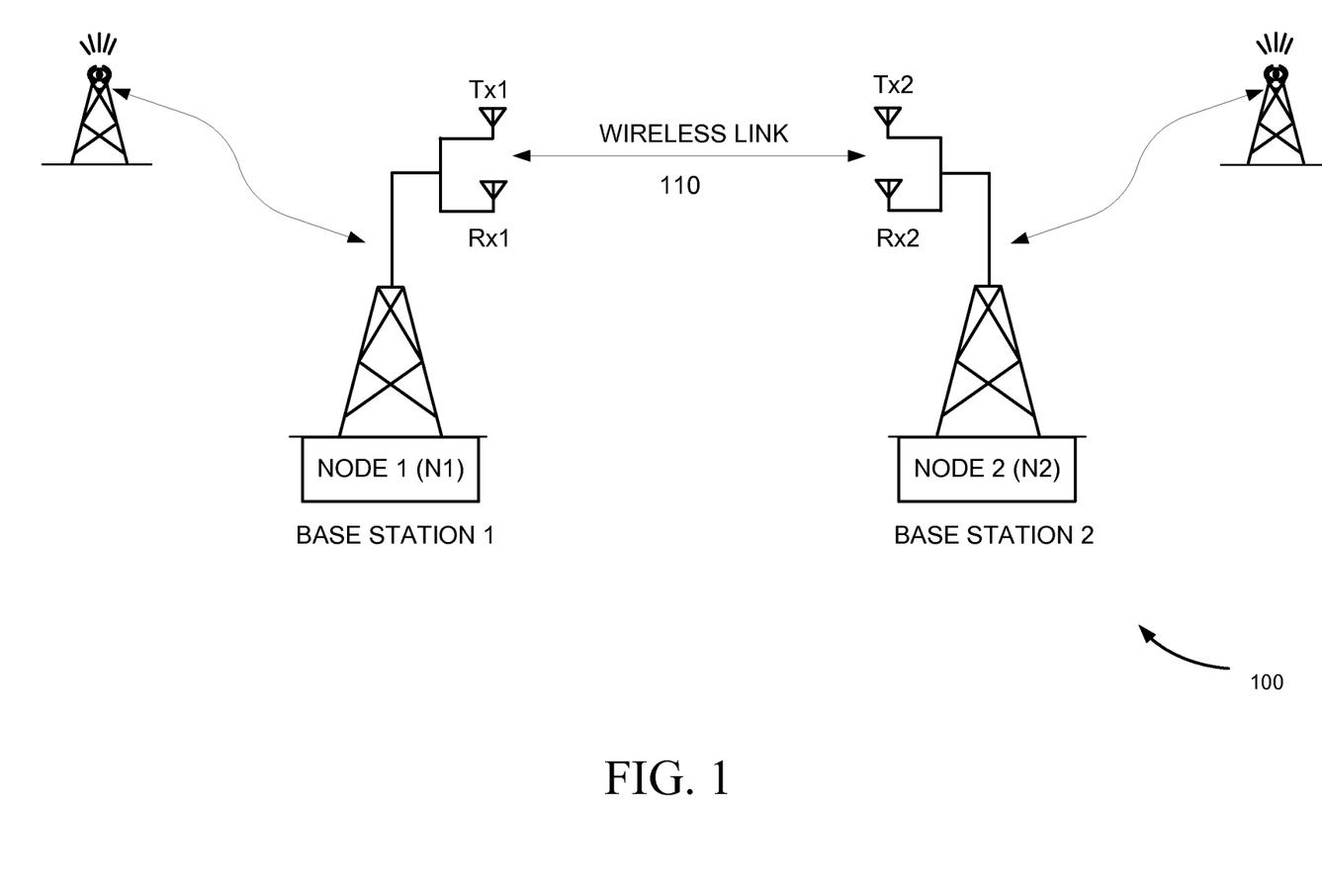
FIG. 1 is a schematic illustration of an exemplifying known wireless link.

A typical wireless communication link is schematically illustrated in FIG. 1. It is preferred that the link 110 is a Line of Sight (LOS) wireless communication link. It is also preferred that the link 110 is fixed, i.e. the emitting and receiving parts of the link 110 are preferably fixed and aligned with respect to each other and can therefore not be operationally moved or transported from one position to another. Typically, LOS links use highly directional antennas arranged such that the antenna lobe of a first antenna (e.g. Tx1) points at a second antenna (e.g. Rx2) and such the antenna lobe of the second antenna (e.g. Tx2) points at the first antenna (e.g. Rx1). Reflections or similar are typically avoided and/or suppressed with respect to known fixed LOS links, e.g. due to the narrow antenna lobes used in this connection.

As can be seen in FIG. 1 the known link 110 comprises a first node N1 with a first antenna Tx1 and a second node N2 with a second antenna Rx1. The nodes N1, N2 and the antennas Tx1, Rx1 respectively are arranged to operatively communicate information via a wireless transmission path 110. The nodes N1, N2 and the antennas Tx1, Rx2 may be arranged to communicate information via the transmission path 110 in one direction only (unidirectional), or in both directions, Tx1/Rx1=Tx2/Rx2 (bidirectional), not shown in FIG. 1. The information may e.g. communicated via the transmission path 110 by means of a microwave signal, e.g. utilizing microwaves above 1 GHz, or above 6 GHz or above 30 GHz, or above 50 GHz including various forms of light.

A drawback associated with the known link 110 is that a malfunction in either node N1, N2 may cause a complete shutdown of the link. Generally, this is not acceptable in commercial applications. For example, microwave links that are used for backhaul communication in wireless mobile communication systems are required to function substantially without any downtime. This means that wireless links for backhaul communication should be more robust against hardware and software failures than link 110.

Figure 2A:
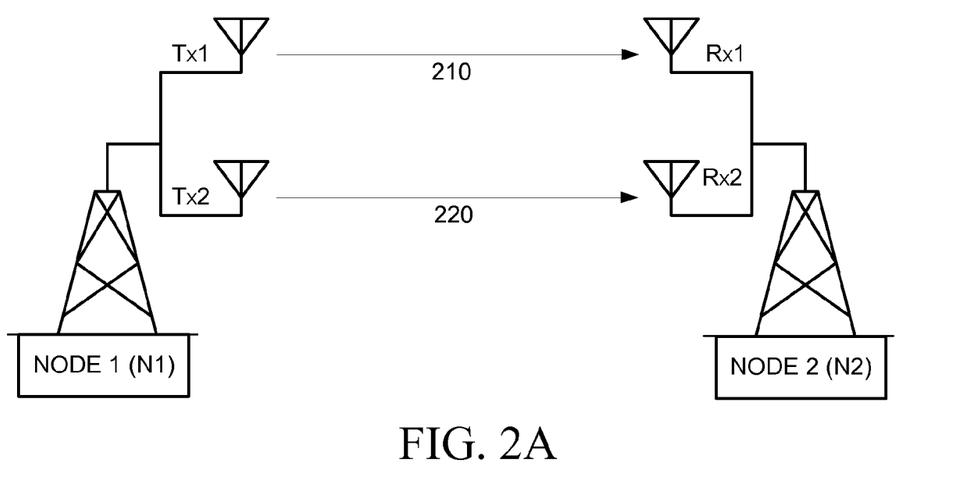
FIG. 2(a) is a schematic illustration of an exemplifying known 1+1 wireless link.
Figure 2B:
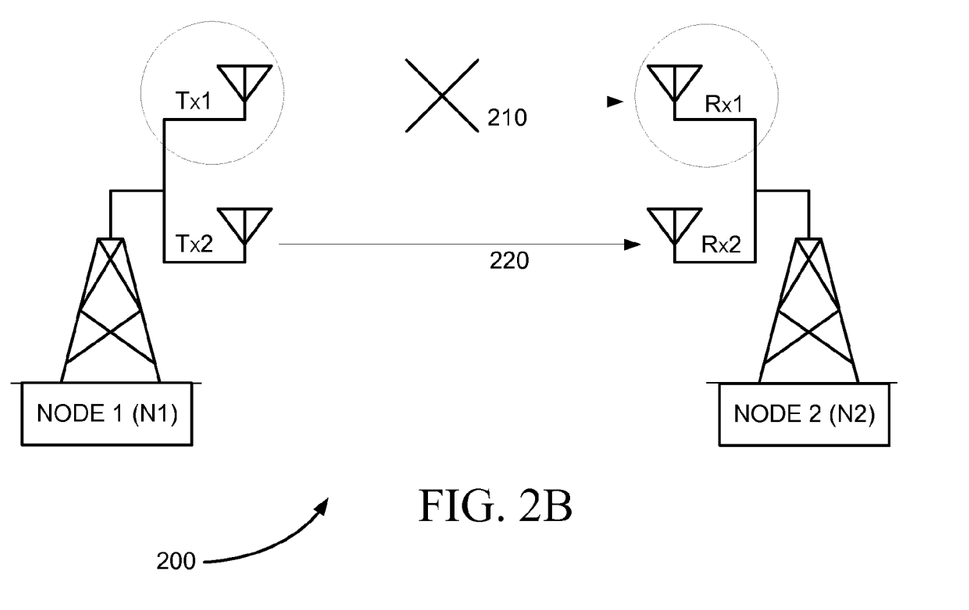
FIG. 2(b) is a schematic illustration of the failure of link in a 1+1 wireless link.

FIG. 2 shows a known 1+1 wireless communication link arrangement 200 that is more robust to hardware and software failures. The link arrangement 200 comprises a primary uni-directional link 210 as described above with reference to FIG. 1 and an additional secondary wireless uni-directional link 220. It is preferred that the secondary link 220 is substantially identical to the primary link 210. Both links 210, 220 are typically a part of the first and second node N1, N2 respectively. Thus, the first node N1 may have a first antenna with transmitter Tx1 and a second antenna transmitter Tx2, whereas the second node N2 may have a first antenna with receiver Rx1 and a second antenna receiver Rx2. In the link 210 the nodes N1, N2 and the antennas of Tx1 and Rx1 are arranged so as to operatively communicate information via a primary wireless transmission path 210, whereas the nodes N1, N2 and the antennas of Tx2, Rx2 are arranged to operatively communicate information via a secondary wireless backup transmission path 220. The secondary transmission path 220 may be identical or substantially identical to the primary transmission path 210. In normal operation the link arrangement 200 uses the primary link 210 as shown in FIG. 2A. In case of a malfunction at either node N1 or N2 affecting the communication via the primary link 210 the link arrangement 200 can continue the operation by switching the communication to the secondary link 220 as shown in FIG. 2B. Thus a malfunction will rarely cause a shutdown of the whole link arrangement 200.

A drawback associated with the known link arrangement 200 is that the secondary link 220 increases the cost of the link arrangement 200 while remaining substantially idle as a redundant backup resource most of the time. For effective communication, one has to install or configure as many numbers of transmitters and receivers on both the transmission and reception side, which again leads to complexity at the individual nodes, further leads to installation cost and maintenance.

Considering that a backhaul link should generally be operational close to 100% of the time. This requirement is emphasized as the demand on backhaul wireless communication links rises, e.g. due to the more effective base stations in the Long Term Evolution (LTE) defined within the framework of the 3$^{rd}$ Generation Partnership Project requiring backhaul communication with Gigabit capacity or more between the radio access node(s) (i.e. a base station such as the NodeB or the eNodeB) and a core network and/or a core network node.

Thus, there seems to be a need for a wireless communication link arrangement that provides an increased capacity, low cost, low maintenance, less complex particularly in case of a failure.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one aspect of the present invention is a protection switching method in an LTE network, the method comprising: a plurality of base transceiver station (BTS) linked by the network over which the base transceiver stations communicate, wherein the network includes at least one primary BTS and at least two secondary BTS, and wherein each BTS includes at least two bidirectional antennas, provisioning traffic to at least one secondary BTS as work BTS for backhauling the traffic, wherein the traffic includes user data traffic, control and signaling data traffic from the primary BTS, checking periodically for control signal by all the BTS, wherein the control signals are periodically transmitted and received by all the BTS directly or indirectly via another secondary BTS to check the status of wireless link, transparently and steering, upon failure of the work wireless X2 link between the primary BTS and the secondary BTS, the beam of the primary BTS appropriately to the next available BTS as protect BTS, wherein the steering is based on the computed pre-coder vector value at the primary BTS.

In another aspect of the present invention is an eNodeB or a relay node or a BTS, comprising: at least one antenna attached to the BTS, wherein the antenna includes at least two transmitter to transmit a beam signal and a plurality of receiver to receive a plurality of beam signal in a communication network, a processor including a memory and a control unit communicatively coupled the processor, wherein the control circuit is configured for switching the traffic in a network, wherein the configuration includes: communicating with a plurality of base transceiver station (BTS) linked by a communication network over which the base transceiver stations communicate, wherein the network includes at least one primary BTS and at least two secondary BTS, and wherein each BTS includes a t least two bidirectional antennas, provisioning traffic to at least one secondary BTS as work BTS for backhauling the traffic, wherein the traffic includes user data traffic, control and signaling data traffic from the primary BTS, checking periodically for control signal by all the BTS, wherein the control signals are periodically transmitted and received by all the BTS directly or indirectly via another secondary BTS to check the status of wireless link, transparently and steering, upon failure of the work wireless X2 link between the primary BTS and the secondary BTS, the beam of the transmission by the primary BTS to the next available BTS as protect BTS, wherein the steering is based on the computed pre-coder vector value at the primary BTS.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the detailed description of the invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAIL DESCRIPTION OF THE INVENTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "computer", "processor" or "controller" may be provided through the use of dedicated hardware as well as hardware capable of executing software in the form of coded instructions stored on computer readable medium. A computer is generally understood to comprise one or more processors, and the terms computer and processor may be employed interchangeably herein. When provided by a computer or processor, the functions may be provided by a single dedicated computer or processor, by a single shared computer or processor, or by a plurality of individual computers or processors, some of which may be shared or distributed. Such functions are to be understood as being computer-implemented and thus machine-implemented. Moreover, use of the term "processor" or "controller" shall also be construed to refer to other hardware capable of performing such functions and/or executing software, and may include, without limitation, digital signal processor (DSP) hardware, reduced instruction set processor, hardware (e.g., digital or analog) circuitry, and (where appropriate) state machines capable of performing such functions.

Figure 3:
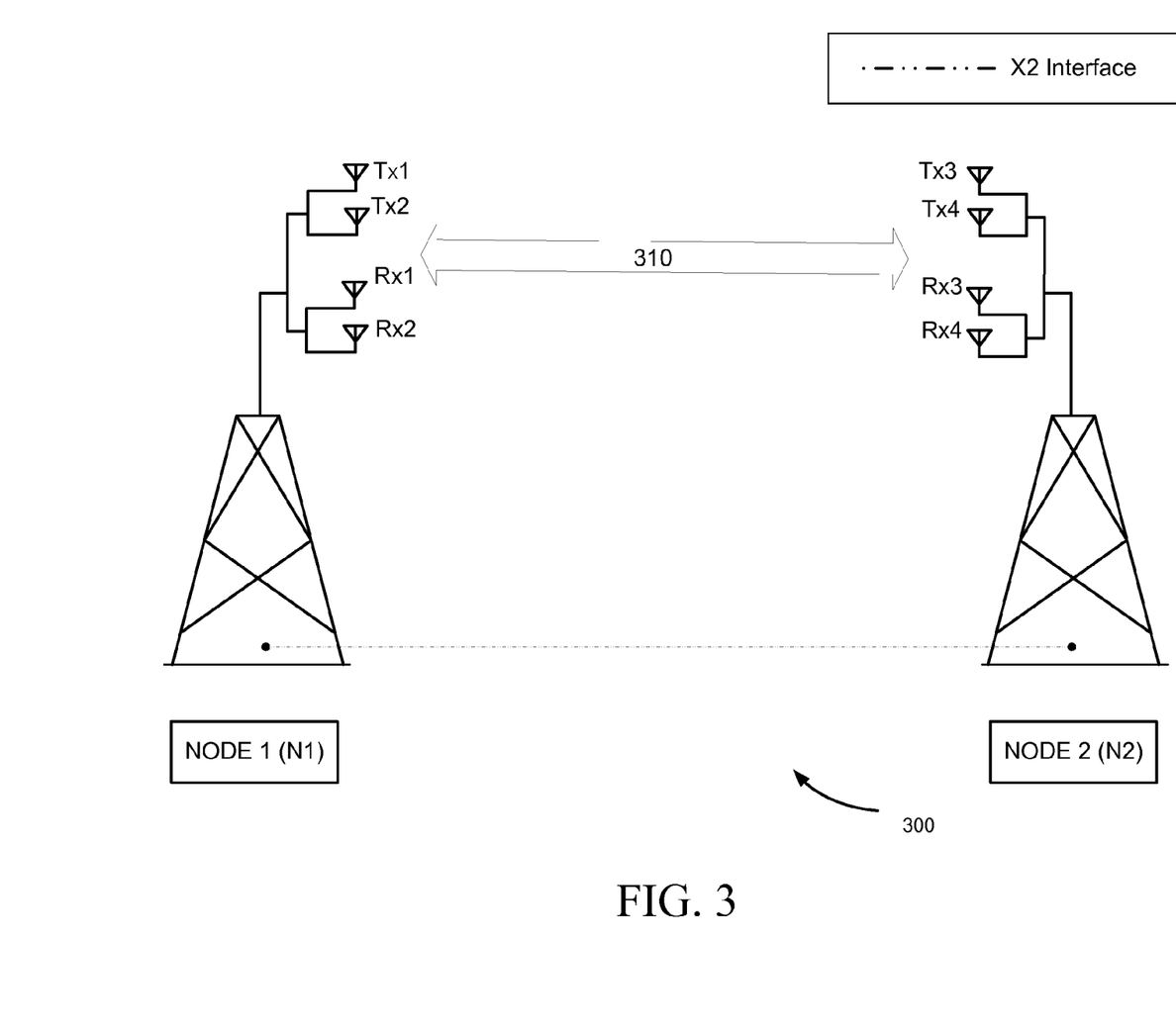
FIG. 3 is a schematic illustration of an exemplifying wireless communication link arrangement, where the arrangement has equal number of transmitters and receivers.

FIG. 3 is a schematic illustration of an exemplifying wireless communication link arrangement 300, where the arrangement has equal number of transmitters and receivers. The link 310 provides an increased capacity compared to the links 110 and 210 described above in FIGS. 1 and 2. The link 310 may be a Line of Sight (LOS) wireless communication link. In addition, or alternatively, the link 310 may be a fixed link, i.e. the emitting and receiving parts of the link 310 are preferably fixed and aligned with respect to each other and can therefore not be operationally moved or transported from one position to another.

The link arrangement 300 comprises a first node N1 (NODE 1) and a second node N2 (NODE 2). The nodes N1, N2 are typically separated by a physical distance of about 20-60 km, though they may be arranged at a much closer distance (e.g. less than 500 meters). This may e.g. be the case when the link 310 is used instead of wired communication (e.g. including copper and optical fibers etc), e.g. in cities where the wireless link hop may only extend from one building to another separated by a street or similar.

It is preferred that node N1 is provided with at least two (2) and preferably four (4) antenna arrangements Tx1, Tx2, Rx1, Rx2 with the transmitter-receiver (Tx/Rx) pair in one antenna in two antenna case or separately in each antenna in four antenna case, i.e. two transmitters are coupled with two antenna and two receivers are coupled with additional two antenna. It is also preferred that node N1 and its antenna arrangements is arranged to operatively communicate information with node N2 through wireless transmission paths indicated by arrows in FIG. 3. Similarly it is preferred that node N2 has at least two (2) and preferably four (4) antenna arrangements Tx3, Tx4, Rx3, Rx4, and it is also preferred that node N2 is arranged to operatively communicate information with node N1 through the transmission paths. Tx1, Tx2, Rx1 and Rx2 on Node 1 and Tx3, Tx4, Rx3 and Rx4 on Node 2, it is also preferred that by having only 2 antenna on Node 1 and 2 antenna on Node 2 with each antenna having Tx/Rx pairs connected to it at the BTS. If Tx and Rx are different frequencies (FDD) then duplexor is used. If Tx and Rx are same frequency (TDD) then guard interval is used to switch from transmitting to receiving mode.

Figure 4:
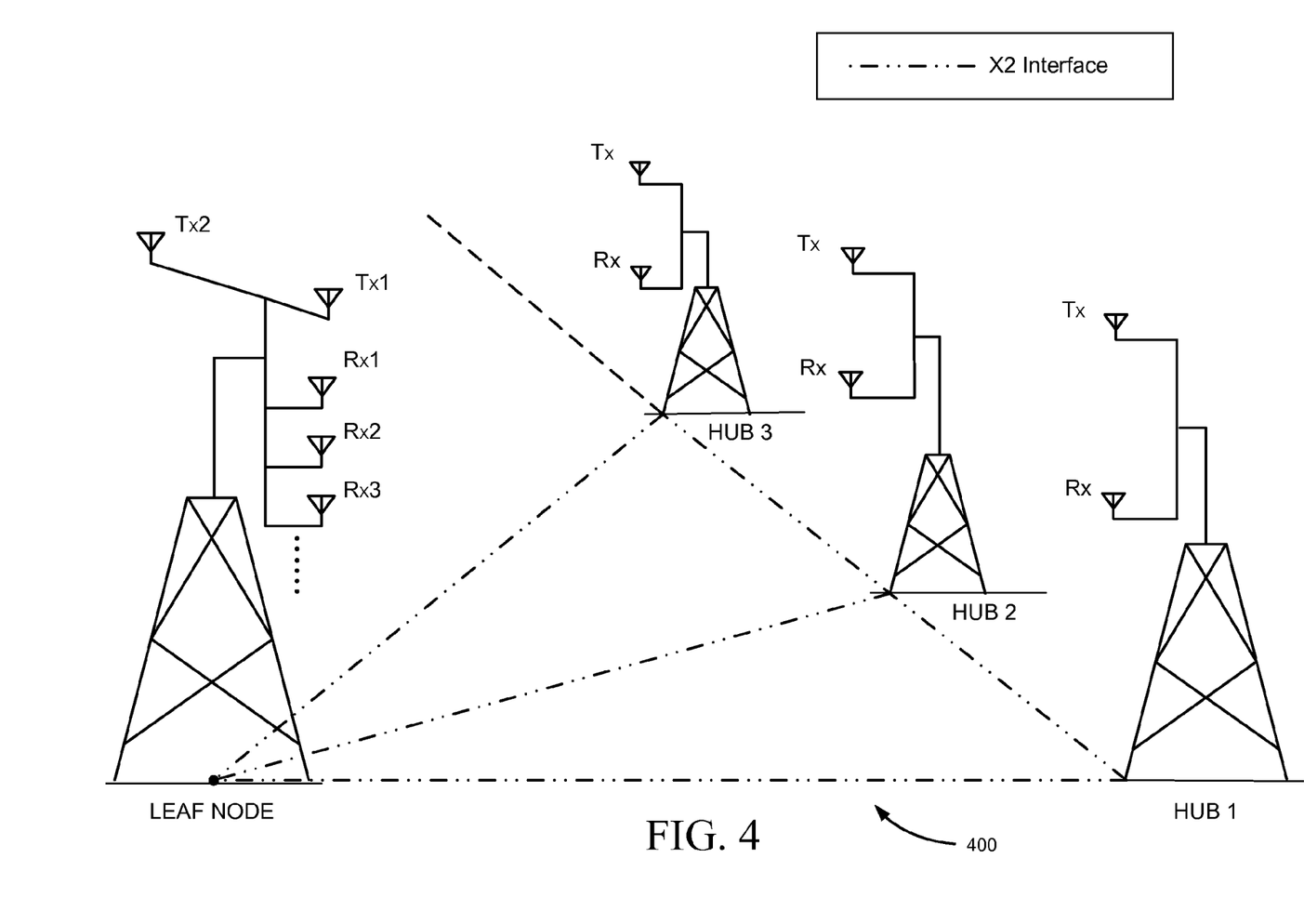
FIG. 4 is a schematic illustration of an exemplifying wireless communication link arrangement with at least two antennas in accordance with one embodiment of the present invention.

FIG. 4 is a schematic illustration of an exemplifying wireless communication link arrangement 400 with at least two antennas in accordance with one embodiment of the present invention. The example arrangement shows a leaf node (also referred to as a primary node), hub node 1, hub node 2, and hub node 3. The primary node has minimum at least two transmitter unit and at least one receiver unit. The number of transmitter is not limited by two units as it may vary by using additional units or antennas for beam forming or diversity towards the leaf node. Further, hub node 1, hub node 2 and hub node 3 has one transmitter unit coupled and one receiver unit as all the hubs will be receiving only from single primary node when a beam is steered towards them. The primary BTS needs at least two transmitters connected to two antennas, one each to each antenna, physically or spatially separated, for beam-forming using pre-coder vectors. The primary node needs as many receivers coupled to the antenna, one receiver each to one antenna, with same number of receivers as there are hub nodes in order to decode the signals transmitted by each hub node using receiver-side beam-forming also called as receiver-side interference suppression or cancellation.

Figure 5:
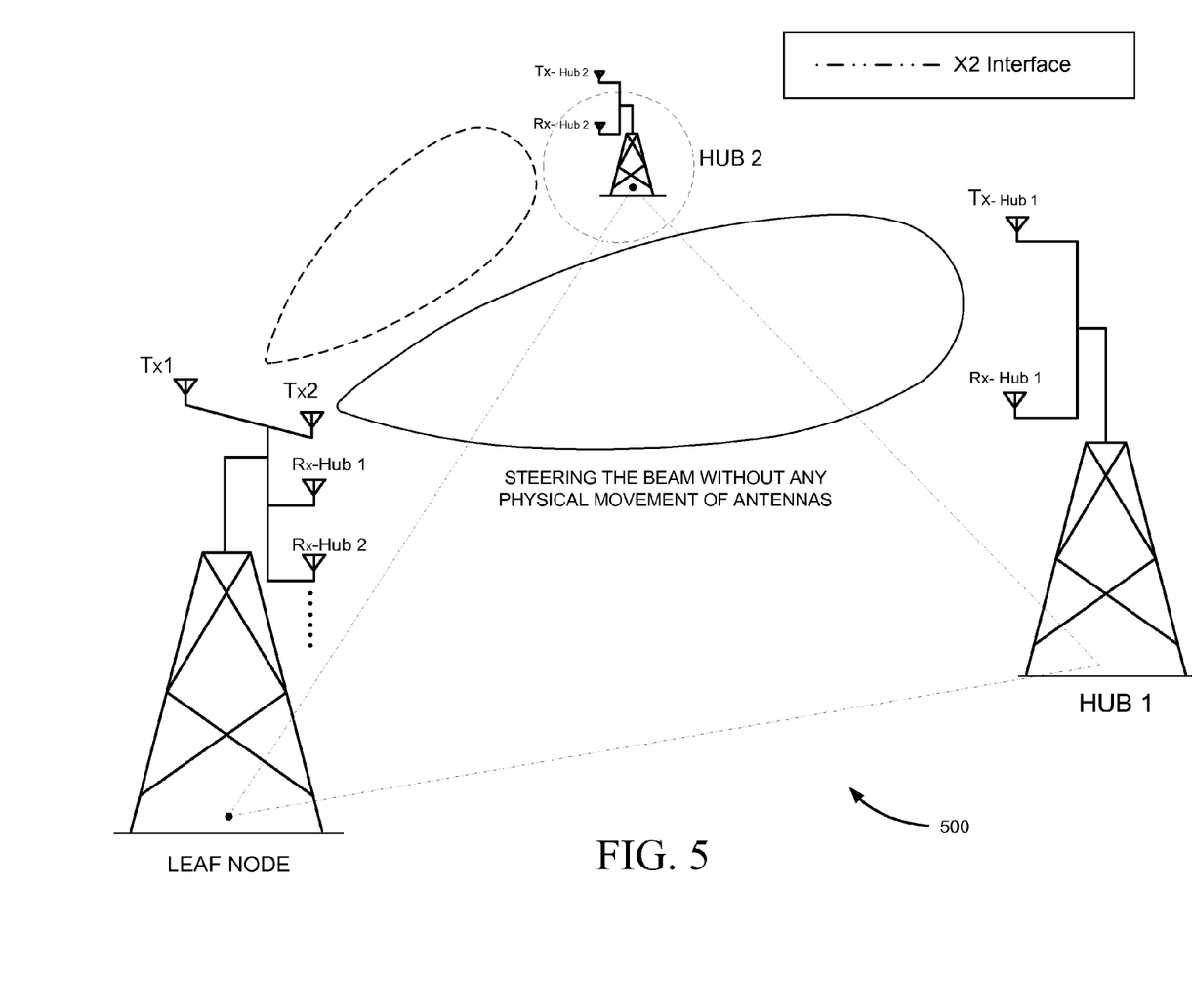
FIG. 5 is an illustrating of the operation of a protection switching method in an LTE network as discussed in FIG. 4.

FIG. 5 shows an example operation arrangement of beam forming in accordance with one embodiment of the present invention. The arrangement 500 includes at least one primary node and one or more secondary nodes. Any link between the primary node to secondary nodes and secondary node to another secondary node is an X2 interface, where X2 can be of wired or wireless. When the link is intact during the process of transporting traffic between the primary node and the rest of the network (i.e. provisioning of traffic to one of the secondary node from the primary node), the primary node uplink or downlink all the traffic to the next secondary node (in this example as shown in FIG. 5, secondary node 2 or hub node 2 is the next secondary node). The traffic between the primary node and the next secondary node is called work node or work link. The traffic may be or may include user data traffic, control and signaling data traffic from the primary node. The wireless links (control signal) between all the nodes are checked periodically to determine whether the link is intact between the nodes. The control signals are periodically transmitted and received by all the nodes directly or indirectly via another secondary node to check the status of wireless link.

Upon detection of failure in work node or work link (i.e. link failure between the primary node and the secondary node 2 or hub node 2), the beam of the primary node is steered appropriately to the next available secondary node (in the present case secondary node 1 or hub node 1) as protect node or protect link, where the steering is based on the computed pre-coder vector value at the primary node. As the transmitter antenna on the primary node is not facing any particular secondary node, the signals to be transmitted are multiplied with a pre-coder vector and depending on the value of the elements (complex number) the transmitter beam is directed to appropriate secondary node. The backhauling of the traffic is shifted from the secondary node 2 or hub node 2 to secondary node 1 or hub node 1. Here the secondary node 1 or hub node 1 act as a protect node during the failure of wireless link between the primary node and the secondary node (work node). The failure of wireless link may be due to node failure or link failure or bad signal etc. Once the switch over is done, the role of the secondary node 2 or hub node 2 is now exchanged to secondary node 1 or hub node 1 after successful steering of the beam from secondary node or hub node 2 to secondary node 1 or hub node 1.

Figure 6:
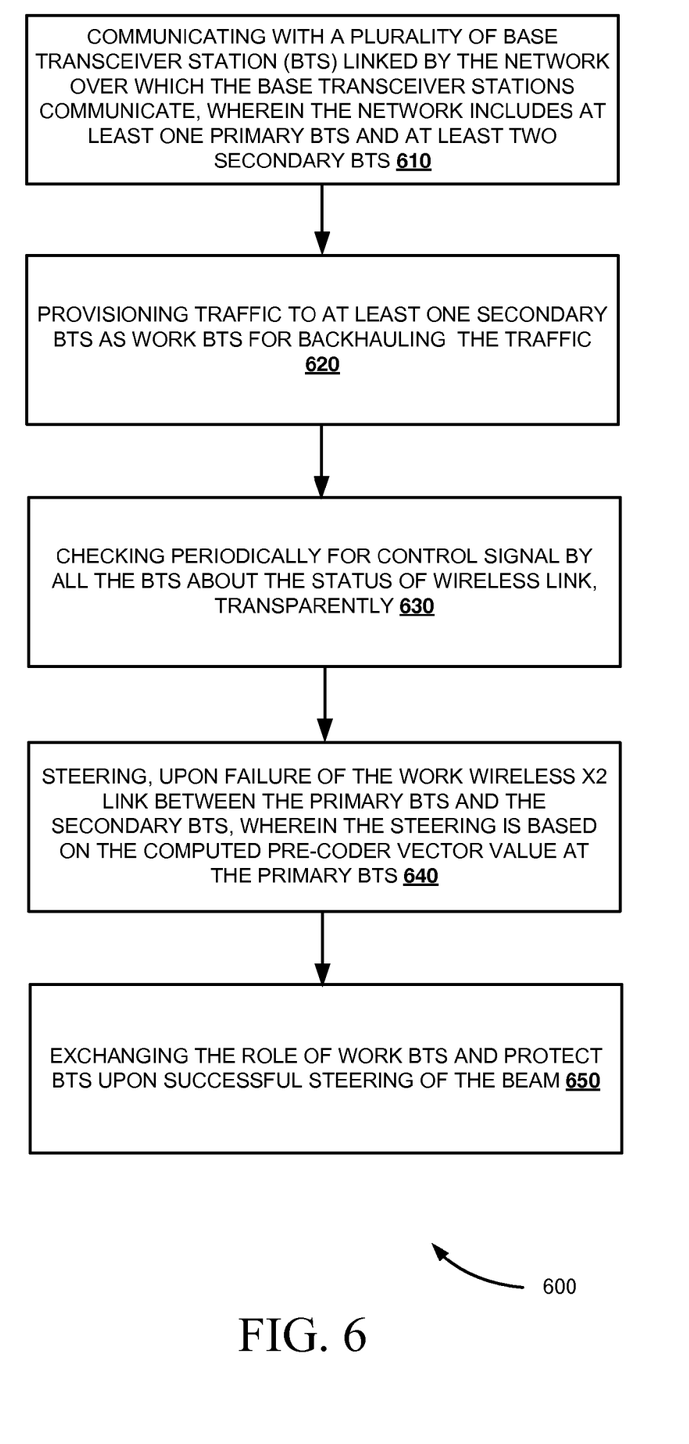
FIG. 6 is a flowchart illustrating the operation of an exemplifying embodiment of the present invention of a protection switching method in an LTE network.

FIG. 6 is a flowchart illustrating the operation of a protection switching method 600 in an LTE network according to one embodiment of the present invention. At step 610, the method communicate with a plurality of base transceiver station (BTS) linked by the network over which the base transceiver stations communicate, where the network has at least one primary BTS and at least two secondary BTS, and wherein each BTS includes at least two bidirectional antennas.

At step 620, the method provisions the traffic to at least one secondary BTS as work BTS for backhauling, where the traffic may include a user data traffic, control and signaling data traffic between the primary BTS and work BTS. Downlinking user traffic towards a user equipment append to the primary BTS is from the work BTS to the primary BTS over X2 interface in the first communication area using a first frequency band and up-linking the user traffic from the user equipment append to the primary BTS using wireless X2 channel from primary BTS to work BTS in the first communication area using second frequency band, where the first frequency and the second frequency of the first communication area are same for a TDD mode.

The uplink and downlink mechanism over the wireless channel is Time Division Duplex (TDD) Mode and the ratio of uplink and downlink user data rate is n:0 or 0:n. Further, the uplink and downlink mechanism over the wireless channel is Time Division Duplex (TDD) Mode and the ratio of uplink and downlink throughput data rate is n:0 or 0:n.

At step 630, the method checks periodically for control signal by all the BTS, where the control signals are periodically transmitted and received by all the BTS directly or indirectly via another secondary BTS to check the status of wireless link, transparently. The control signals are periodically exchanged between the secondary BTSs via X2 interface and between the primary BTS and the work BTS via X2 interface. The control signals are periodically exchanged between the primary BTS and the protect BTS over non-congruent reverse path in an access communication network, and where the access communication network includes BTSs, UEs and wireless channel. Further, the control signals from protect BTS to primary BTS is directly over wireless X2 channel and from primary BTS to protect BTS is via work BTS over plurality of X2 interface (either wired or wireless)

At step 640, the method steers the beam of the primary BTS appropriately to the next available BTS as protect BTS, upon failure of the work wireless X2 link between the primary BTS and the secondary BTS, where the steering is based on the computed pre-coder vector value at the primary BTS. The primary BTS is operated in a TDD Mode, where at least one receiver is used for down-linking user traffic and control traffic from work BTS and at least one receiver is used for down-linking control traffic from protect BTS and at least one transmitter is used for up-linking user traffic and control traffic from primary BTS to work BTS.

At step 650, the method exchanges the role of work BTS and protect BTS upon successful steering of the beam, where the steering the beam of transmission to the next available BTS is accomplished by without physical movement of the antennas.

Although the method flowchart includes steps 610-650 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 7:
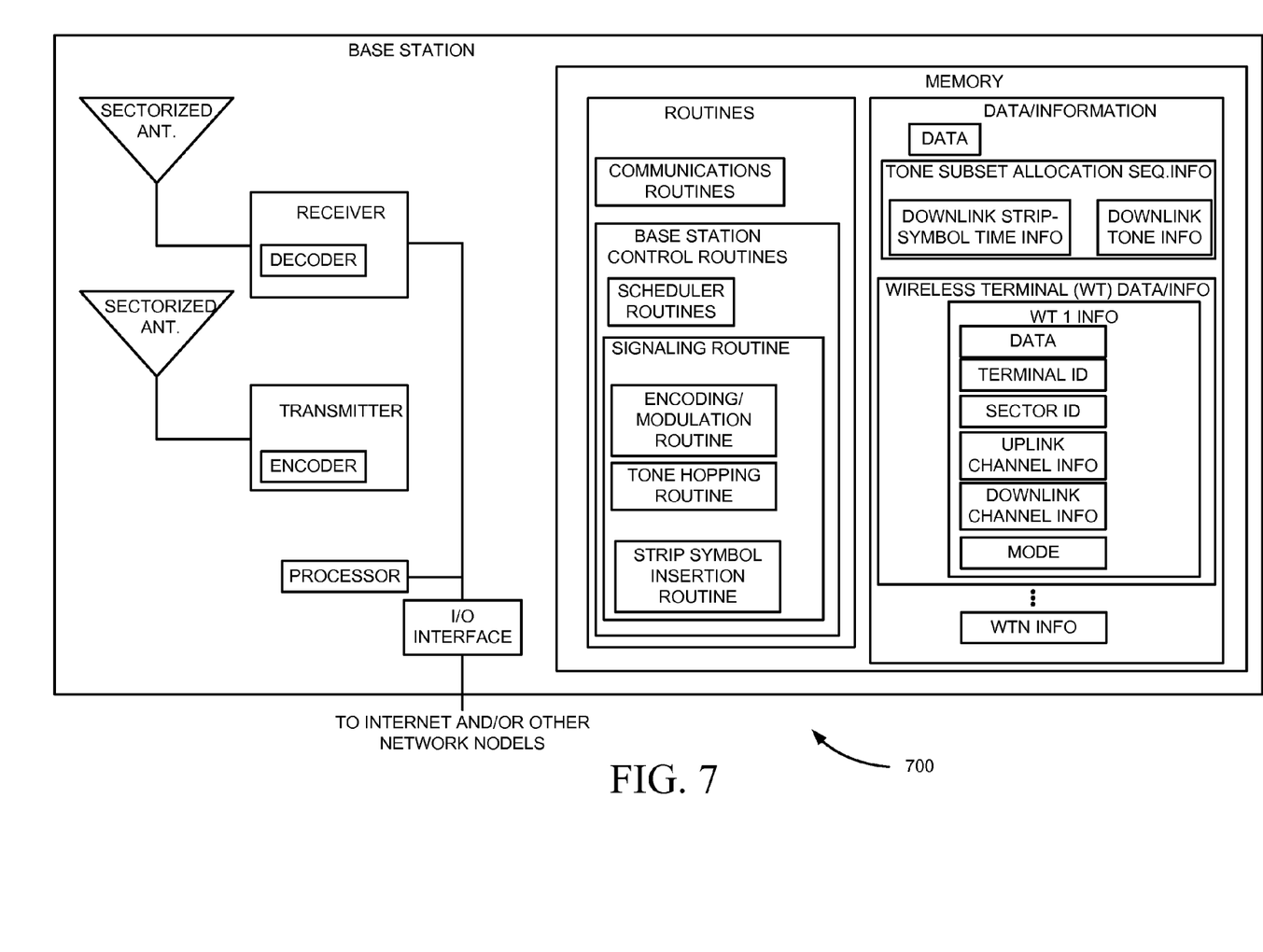
FIG. 7 is an illustration of an example base station in accordance with various aspects.

FIG. 7 illustrates an example base station 700 in accordance with various aspects. Base station implements tone subset allocation sequences, with different tone subset allocation sequences generated for respective different sector types of the cell. Base station may be used as any one of base stations of the system of FIG. 4. The base station includes a receiver, a transmitter, a processor, e.g., CPU, an input/output interface and memory coupled together by a bus over which various elements may interchange data and information.

Sectorized antenna coupled to receiver is used for receiving data and other signals, e.g., channel reports, from wireless terminals transmissions from each sector within the base station's cell. Sectorized antenna coupled to transmitter is used for transmitting data and other signals, e.g., control signals, pilot signal, beacon signals, etc. to wireless terminals or nodes within each sector of the base station's cell. In various aspects, base station may employ multiple receivers and multiple transmitters, e.g., an individual receiver for each sector and an individual transmitter for each sector. Processor, may be, e.g., a general purpose central processing unit (CPU). Processor controls operation of base station under direction of one or more routines stored in memory and implements the methods. I/O interface provides a connection to other network nodes, coupling the BS to other base stations, access routers, AAA server nodes, etc., other networks, and the Internet. Memory includes routines and data/information.

Data/information includes data, tone subset allocation sequence information including downlink strip-symbol time information and downlink tone information, and wireless terminal (WT) data/info including a plurality of sets of WT information: WT 1 info and WT N info. Each set of WT info, e.g., WT 1 info includes data, terminal ID, sector ID, uplink channel information, downlink channel information, and mode information.

Routines include communications routines and base station control routines. Base station control routines includes a scheduler routine and signaling routines including an encoding/modulation routine, a tone hopping routine, and a strip symbol insertion routine. Scheduler routine controls determining a type of downlink transmission unit to transmit (e.g., type 0, type 1, . . . ).

Data includes data to be transmitted that will be sent to encoder of transmitter for encoding prior to transmission to WTs, and received data from WTs that has been processed through decoder of receiver following reception. Downlink strip-symbol time information includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information includes information including a carrier frequency assigned to the base station, the number and frequency of tones, and the set of tone subsets to be allocated to the strip-symbol periods, and other cell and sector specific values such as slope, slope index and sector type.

Data may include data that WT 1 has received from a peer node, data that WT 1 desires to be transmitted to a peer node, and downlink channel quality report feedback information. Terminal ID is a base station assigned ID that identifies WT 1. Sector ID includes information identifying the sector in which WT 1 is operating. Sector ID can be used, for example, to determine the sector type. Uplink channel information includes information identifying channel segments that have been allocated by scheduler for WT 1 to use, e.g., uplink traffic channel segments for data, dedicated uplink control channels for requests, power control, timing control, etc. Each uplink channel assigned to WT 1 includes one or more logical tones, each logical tone following an uplink hopping sequence. Downlink channel information includes information identifying channel segments that have been allocated by scheduler to carry data and/or information to WT 1, e.g., downlink traffic channel segments for user data. Each downlink channel assigned to WT 1 includes one or more logical tones, each following a downlink hopping sequence. Mode information includes information identifying the state of operation of WT 1, e.g. sleep, hold, on.

Communications routines control the base station to perform various communications operations and implement various communications protocols. Base station control routines are used to control the base station to perform basic base station functional tasks, e.g., signal generation and reception, scheduling, and to implement the steps of the method of some aspects including transmitting signals to wireless terminals using the tone subset allocation sequences during the strip-symbol periods.

Signaling routine controls the operation of receiver with its decoder and transmitter with its encoder. The signaling routine is responsible for controlling the generation of transmitted data and control information. Encoding/modulation routine controls coding and modulation for non-strip symbols and strip symbols. Further, tone hopping routine controls tone hopping in connection with non-strip symbols. Moreover, strip symbol insertion routine controls selectively positioning a strip symbol within a type 1 downlink transmission unit.

Expressions such as "including", "comprising", "incorporating", "consisting of, "have", "is" used to describe and claim the present invention are intended to be construed in a nonexclusive manner, namely allowing for items, components or elements not explicitly described also to be present. Reference to the singular is also to be construed to relate to the plural and vice versa.

Numerals included within parentheses in the accompanying claims are intended to assist understanding of the claims and should not be construed in any way to limit subject matter claimed by these claims.

FIGS. 1-7 are merely representational and are not drawn to scale. Certain portions thereof may be exaggerated, while others may be minimized. FIGS. 1-7 illustrate various embodiments of the invention that can be understood and appropriately carried out by those of ordinary skill in the art.

I claim:

1. A protection switching method comprising:
    a plurality of base transceiver station (BTS) linked by a network over which the base transceiver stations communicate, the plurality of BTS comprising a primary BTS and at least two secondary BTS, wherein each of the plurality of BTS includes at least two bidirectional antennas;
    provisioning a traffic to a first BTS of the at least two secondary BTS as a work BTS for backhauling the traffic, wherein the traffic includes user data traffic, control and signaling data traffic from the primary BTS;
    checking periodically for control signal by each of the plurality of BTS, wherein checking the control signals comprises periodically receiving the control signal from the work BTS and receiving the control signal from remainder of the at least two secondary BTS via the work BTS, wherein the remainder of the at least two secondary BTS are configured to exchange the control signals indirectly via the work BTS with the primary BTS over a non-congruent path, and wherein checking for the control signals comprises checking a status of a wireless link between each of the plurality of BTS; and
    steering, upon detection of a failure of the wireless link between the primary BTS and the work BTS, a beam of the primary BTS towards a second BTS of the at least two secondary BTS, the second BTS of the at least two secondary BTS being designated as a protect BTS, wherein steering the beam of the primary BTS comprises multiplying the beam with a computed pre-coder vector value at the primary BTS, and wherein steering the beam of the of the primary BTS comprises steering the beam without mechanical rotation of the at least two bidirectional antennas of the primary BTS.

2. The method of claim 1, further comprising:
    exchanging a role of the work BTS and the protect BTS upon successful steering of the beam.

3. The method of claim 2, wherein the control signals from the protect BTS to the primary BTS is exchanged directly over a wireless X2 channel and wherein the control signals from the primary BTS to the protect BTS is exchanged via the work BTS over a plurality of X2 interfaces.

4. The method of claim 1, further comprising
    down-linking the user data traffic towards a user equipment appended to the primary BTS from the work BTS to the primary BTS over a X2 interface using a first frequency band; and
    up-linking the user data traffic from the user equipment using the X2 interface from primary BTS to the work BTS using a second frequency band,
    wherein the first frequency and the second frequency of the first communication area are same for a time division duplex (TDD) mode.

5. The method of claim 4, wherein the up-linking and the down-linking is over a wireless channel in the Time Division Duplex (TDD) Mode and a ratio of a user data rate for the up-linking and the down-linking is n:0.

6. The method of claim 4, wherein the up-linking and the down-linking is over a wireless channel in a Time Division Duplex (TDD) Mode and a ratio of a user data rate for the up-linking and the down-linking is 0:n.

7. The method of claim 1, wherein the control signals are periodically exchanged between each of the at least two secondary BTS via a X2 interface.

8. The method of claim 1, wherein the control signals are periodically exchanged between the primary BTS and the work BTS via a X2 interface.

9. The method of claim 1, wherein the primary BTS is operated in a time division duplex (TDD) Mode, wherein a first receiver is used for down-linking user traffic and control traffic from the work BTS, a second receiver is used for down-linking control traffic from the protect BTS, and a first transmitter is used for up-linking user traffic and control traffic from the primary BTS to the work BTS.

10. The method of claim 1, wherein the pre-coded vector value is selected from a set of precoding schemes depending upon a topology of the plurality of BTS.

11. A communication network comprising:
   a primary base transceiver station (BTS) having an antenna attached, wherein the antenna includes at least two transmitters to transmit a beam signal and a plurality of receivers to receive a plurality of beam signals in a communication network; and
   a control unit communicatively coupled to the primary BTS, wherein the control circuit is configured to:
      communicate with a plurality of BTS linked by the communication network, wherein the communication network includes the primary BTS and at least two secondary BTS, and wherein each of the at least two secondary BTS includes at least two bidirectional antennas;
      provision traffic to a first BTS of the at least two secondary BTS as a work BTS for backhauling the traffic, wherein the traffic comprises a user data traffic and a control and signaling data traffic from the primary BTS;
      periodically check for control signals by each of the plurality of BTS, wherein the control signals from the work BTS are periodically transmitted directly to the primary BTS, wherein remainder of the at least two secondary BTS periodically transmit the control signals indirectly to the primary BTS via the work BTS over a non-congruent communication path, wherein control unit being configured to check for controls signals comprises the control unit being configured to check a status of a communication link; and
      steer, upon detecting failure of the communication link between the primary BTS and the work BTS, a beam of transmission by the primary BTS to a next available BTS designated as a protect BTS, wherein the steering is based on the computed pre-coder vector value at the primary BTS, and wherein the control unit being configured to steer the beam of the of the primary BTS comprises the control unit configured to:
         multiply the beam with a computed pre-coder vector value at the primary BTS, and
         steer the beam without mechanical rotation of the at least two bidirectional antennas of the primary BTS.

12. The communication network of claim 11, wherein the control circuit is further configured to:
   down-link the user data traffic towards a user equipment appended to the primary BTS from the work BTS to the primary BTS over a X2 interface in a first communication area using a first frequency band; and
   up-link the user data traffic from the user equipment over the X2 interface from the primary BTS to the work BTS in the first communication area using a second frequency band,
   wherein the up-link and the down-link mechanism over the X2 interface is in a Time Division Duplex (TDD) Mode and a ratio of a data rate of the up-link and down-link is n:0 or 0:n.

13. The communication network of claim 11, wherein the communications network is at least one of the following: a $3^{rd}$ Generation mobile communications system, a $4^{th}$ Generation mobile communications system, a $3^{rd}$ Generation Partnership Project Long Term Evolution mobile communications system.

14. The communication system of claim 11, wherein the X2 interface is a wireless communication interface.

15. The communication system of claim 11, wherein the X2 interface is a wired communication interface.

16. The communication network of claim 11, wherein the primary BTS is a base station in the communication network.

* * * * *